United States Patent
Coleman et al.

[19]

[11] Patent Number: 5,855,500
[45] Date of Patent: Jan. 5, 1999

[54] CLACKER-LOLLIPOP HOLDER

[76] Inventors: Thomas J. Coleman, 19170 Paddock Pl., Abingdon, Va. 24211; William K. Schlotter, IV, 117 Wateredge La., Fredericksburg, Va. 22406; Princess Ann Coleman, 19170 Paddock Pl., Abingdon, Va. 24211; Ann M. Schlotter, 117 Wateredge La., Fredericksburg, Va. 22406

[21] Appl. No.: 862,162

[22] Filed: May 22, 1997

[51] Int. Cl.⁶ .................................................. A63H 5/00
[52] U.S. Cl. ........................... 446/81; 446/404; 446/420
[58] Field of Search ........................ 446/71, 81, 404, 446/417, 418, 420, 421, 422; 426/104

[56] References Cited

U.S. PATENT DOCUMENTS

| | | | |
|---|---|---|---|
| 295,138 | 3/1884 | Worcester | 446/420 |
| 1,018,625 | 2/1912 | Long | 446/417 |
| 1,205,313 | 11/1916 | Zim | 446/420 |
| 1,537,390 | 5/1925 | Vincent | 446/418 |
| 2,196,679 | 4/1940 | Krakowski | 446/420 |
| 2,692,443 | 10/1954 | Milligan | 446/418 |
| 3,007,280 | 11/1961 | Berberich | 446/418 |
| 3,137,092 | 6/1964 | Salerno | 446/397 |
| 3,415,009 | 12/1968 | Knauf | 446/81 |
| 3,615,596 | 10/1971 | Petti et al. | 426/104 |
| 4,758,197 | 7/1988 | Lee | 446/418 |

Primary Examiner—Robert A. Hafer
Assistant Examiner—Jeffrey D. Carlson
Attorney, Agent, or Firm—Melvin L. Crane

[57] ABSTRACT

A candy holder noisemaker device designed to make a clacking or ringing sound. The device has a main housing, a switch, a motor and a power supply. The housing encompasses a gearing system with cam rods, clacker arms with attached clacker balls, a clacker bell and a replaceable lollipop. The housing can be made of plastic or any suitable material. Located within the main housing is the power supply that makes contact with the switch, which in turn operates the motor. An upper housing contains the gearing system with the can rods. When the gearing system is engaged, the cam rods make contact with spring loaded clacker arms. This causes the clacker balls, which are attached to the clacker arms and located above the upper housing, to strike alternately on the sides of the clacker bell making a clacker or ringing sound. The clacker bell is attached to the top of the upper housing so the clacker bell can move slightly when struck by the clacker balls. The top of the clacker bell has an aperture with an expandable sleeve that holds the lollipop which can be replaced. The lower end of the main housing is threaded and has an end cap that can be threaded on and off to replace the power supply as needed.

6 Claims, 2 Drawing Sheets

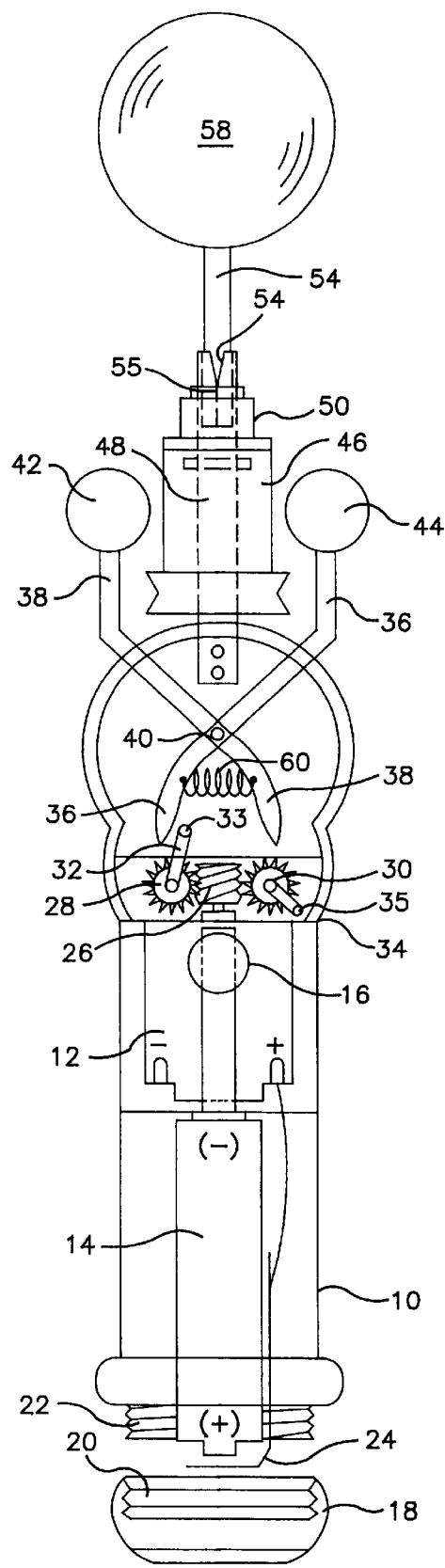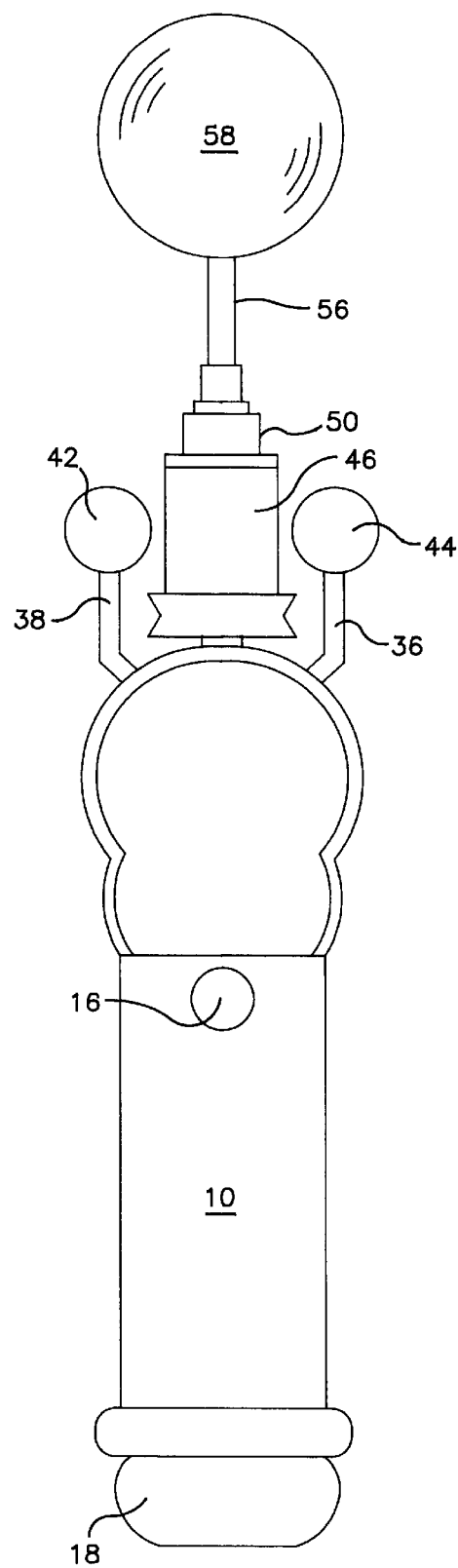
FIG. 2
FIG. 1

CLACKER-LOLLIPOP HOLDER

This invention is directed to a combination clacker and lollipop holder, and, more particularly, the invention is directed to a motor driven clacker which supports a lollipop for consumption.

Heretofore, noise makers have been provided which include a body portion with oppositely disposed clackers mounted on spring metal arms which will move when moved in a certain direction in order to strike the body portion and make a noise. Such devices are known to be used at New Year's parties for making a noise. Such a noise maker can be used by children or adults for amusement.

SUMMARY AND OBJECTS OF THE INVENTION

This invention is directed to motor driven clackers formed as arms extending from a gear wheel which is driven by the motor. The arms contact spring loaded arms as the gears are rotated. The arms are provided with spherical ends or clacker balls which strike a clacker bell to make a ringing sound or a clacking sound. The lower end of the housing includes a motor and power source such as small size batteries. The upper part of the housing includes the clackers, the clacker bell, and means for holding one end of a lollipop stick.

It is therefore an object of the invention to provide an amusing device to which a lollipop is secured for consumption.

Another object is to provide a noise maker in combination with a lollipop holder.

Yet another object is to provide a motor driven noise maker in combination with a lollipop holder.

Still another object is to provide an amusing noise maker in combination with a lollipop holder in which the noise maker can be used in absence of the lollipop.

Other objects and advantages of the invention will become obvious from referring to the description and drawings.

BRIEF DESCRIPTION OF THE DRAWINGS

FIG. 1 is a front view of the clacker-lollipop holder which illustrates the related parts;

FIG. 2 is a partial cross-sectional view illustrating the motor, the power source, the gearing clackers, the ringing device, and the lollipop holder;

DETAILED DESCRIPTION OF THE INVENTION

Figure 4:
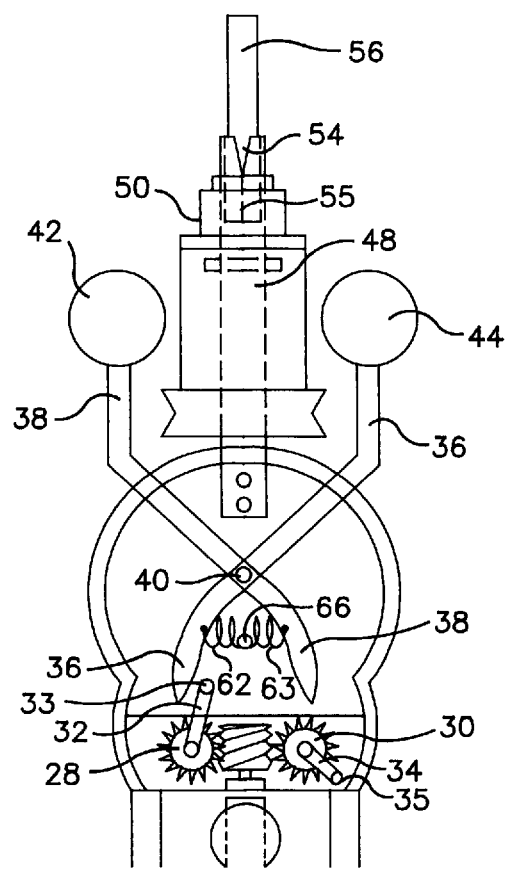
FIG. 4 illustrates a modification of the spring control shown in FIG. 2.
Figure 3:
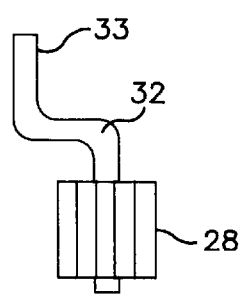
FIG. 3 illustrates a gear rotated 90 degrees which illustrates the clacker arm cam.

Now, referring to the drawings in which like reference characters refer to like parts through the drawing, there is shown in FIG. 1 a front view which illustrates a main body 10. The main body includes therein a motor 12, at least one battery power source 14, and a switch 16 for controlling the power to operate the motor. The bottom of the main body is provided with an end cap 18 which is shown with threads 20 that match corresponding threads 22 on the main body. A positive contact strip 24 is shown by which the electrical circuit for the motor is completed. The motor is provided with a drive gear 26 which drives oppositely disposed driven gears 28, 30, each of which are supported for rotation in the housing. Each of the driven gears 28, 30 are provided with a cam rod 32, 34 each of which have an arm 33, 35 respectively which engage the lower ends of spring loaded arms 36, 38. The spring loaded arms are pivotable about a pivot pin 40 which is secured to the housing for supporting the arms 36, 38. The upper ends of the arms are provided with spherical clacker balls 42, 44 which strike a clacker bell 46 which is secured at its upper end to surround an axially extending central holder 48 that is secured at its bottom to the upper end of the housing. The clacker bell is closed on its upper end by a closure 50 which surrounds the central holder. The upper end 50 supports the clacker bell so that the bottom of the clacker bell is free to move slightly when the clacker strikes the clacker bell. The holder 50 has a blind bore 52 which is provided with an expandable slot 54. The blind bore and at least one axially aligned expandable slit 55 cooperate to secure a bottom end of a lollipop stick 56 which supports a lollipop 58 on the upper end of the stick 56. The lollipop stick is slightly larger than the bore and the slot is provided so that the bore will expand to hold the larger lollipop stick end.

In operation, an electrical source is secured within the housing to supply an electrical source to the motor. A person such as a child can secure a lollipop to the clacker housing. The switch 16 is closed to energize the motor. The motor rotates the drive gear 26 which in turn rotates each of the driven gears 28, 30. The gear 28 rotates counterclockwise and the gear 50 rotates clockwise so that the arms strike the inner surface of the arms 36 and 38 respectively. The driven gears rotate and as they rotate the arms 33 and 35 alternately strike the clacker bell to make a clacker and/or ringing sound. The clacker device is held by the housing in order not to interfere with the clacker arms. The clacker arms are provided with a return spring 60 so that the clacker arms return to their normal rest position juxtaposed the clacker bell.

As the arms 33 and 35 strike the inner surface of each of the arms 36 and 38, the arms move the balls 42 and 44 away from the clacker bell. The spring 60 forces the lower end of the arms inwardly so that the ball strikes the clacker bell to make a clacker and/or ringing noise.

FIG. 4 illustrates a modification of the spring. As shown, there are two separate springs 62 and 64 each of which have one end secured to a central post 66. The opposite ends are secured to the arms. By this modification one arm has no effect on the other arm since the spring force is applied separately to each of the arms.

It would be obvious to one skilled in the art that the switch 16 can be operated to close a switch contact for continuous operation or to close a switch only during a time in which the switch is held in contact with the switch contacts. A spring means will function to apply a force on the switch to hold the switch in an off position. Thus, the switch must be pressed in order to close the circuit. When the switch retains its rest position the circuit is broken and the motor will cease operation.

It would be obvious to one that the housing can be of most any shape or form and can be provided with a picture or any other art work without interfering with the operation of the clacker arms. The housing should be made of a material and without any sharp edges that will be harmful to a person.

The foregoing relates to preferred exemplary embodiments of the invention, it being understood that other variants and embodiments thereof are possible within the spirit and scope of the invention, the latter being defined by the appended claims.

We claim:

1. A clacker lollipop holder which comprises, a housing, said housing including a lollipop holder, a motor with an electrical source, electrical circuitry and a switch control in said housing, a first drive gear which is driven by said motor, a first and a second driven gear which are driven by said first drive gear, a clacker bell supported by said housing, said first driven gear drives a first cam arm and said second driven gear drives a second cam arm, said first cam arm and said second cam arm alternately contact a separate first movable arm and a second separate moveable arm, and each of said first and second movable arms alternately strike said clacker bell to make a clacker and/or ringing sound, said lollipop holder is supported by an upper end of said housing, and said lollipop holder includes a blind bore with at least one axially extending slot which secures one end of a lollipop stick.

2. A clacker lollipop holder as set forth in claim 1, in which, said lollipop holder includes more than one axially aligned slot.

3. A clacker lollipop holder as set forth in claim 1, in which, said lollipop holder includes oppositely disposed axially aligned slots.

4. A clacker lollipop holder as set forth in claim 1 which comprises a spring means for applying a spring force on one end of each of said separate movable arms.

5. A clacker lollipop holder as set forth in claim 1, in which, a separate spring applies a force on one end of each of said separate first and second movable arms.

6. A clacker lollipop holder which comprises, a housing, said housing including lollipop holder, a motor with an electrical source, electrical circuitry and a switch control in said housing, a drive gear which is driven by said motor, a first and a second driven gear which are driven by said drive gear, a clacker bell supported by said housing, said first driven gear drives a first cam arm and said second driven gear drives a second cam arm, said first cam arm and said second cam arm alternately contact a separate first movable arm and a second separate movable arm, a single spring means for directly applying a spring force on one end of each of said separate first and second movable arms, and each of said first and second movable arms alternately strike said clacker bell to make a clacker and/or ringing sound.

* * * * *